Patented Aug. 24, 1937

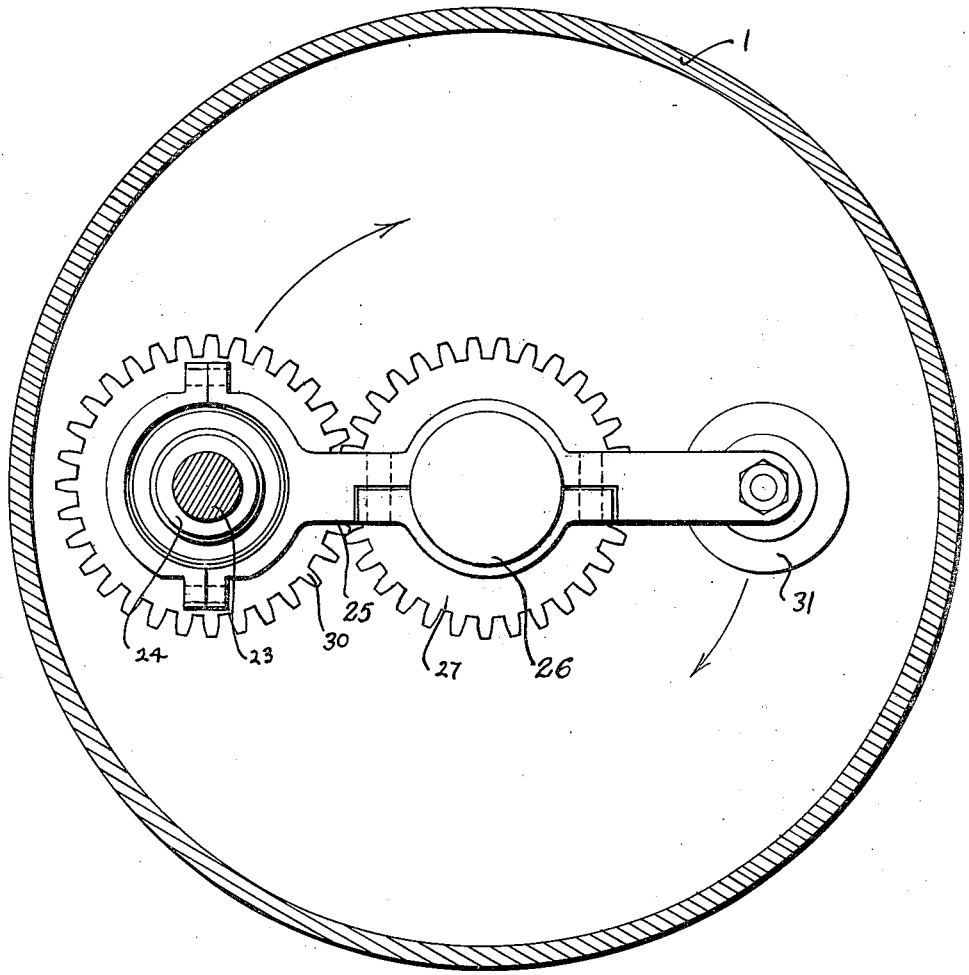

2,090,810

UNITED STATES PATENT OFFICE 2,090,810

POWER TRANSMISSION AND DRIVE

Earl C. Russell and Lester A. Cosens, Portland, Oreg.

Application May 14, 1936, Serial No. 80,719

5 Claims. (Cl. 74—299)

Our invention has for its purpose and object the transmission of power between a driving shaft and a driven shaft at the same rate of rotation or at a different rate of rotation.

The invention is comprised primarily of a driving shaft and a driven shaft journaled respectively within a casing and having fixed gears disposed within the case and having rotation transmitted from the driving shaft to the driven shaft through a link having a universal joint disposed upon the respective ends of the link and through the instrumentalities for imparting rotation at a predetermined speed from the driving to the driven shaft. Means is provided for maintaining the case lubricant-tight in order that all of the articulating joints and bearings may be properly lubricated during the operation of the same.

The primary purpose and object of our invention consist in providing means for the transmission of power, the principle of which may be utilized for imparting rotation to shafts having a common longitudinal axial center line at the same rate or at a different rate of speed.

A still further object of our invention consists in so constructing the device that it will be comprised of few parts, one that may be made up of standard parts, one that will be simple in construction and be practically free from mechanical operating annoyances.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:

Fig. 3 is a sectional end view of the driven end of the device. This view is taken on line 3—3 of Fig. 1, looking in the direction indicated.

Like reference characters refer to like parts throughout the several views.

Figure 1:
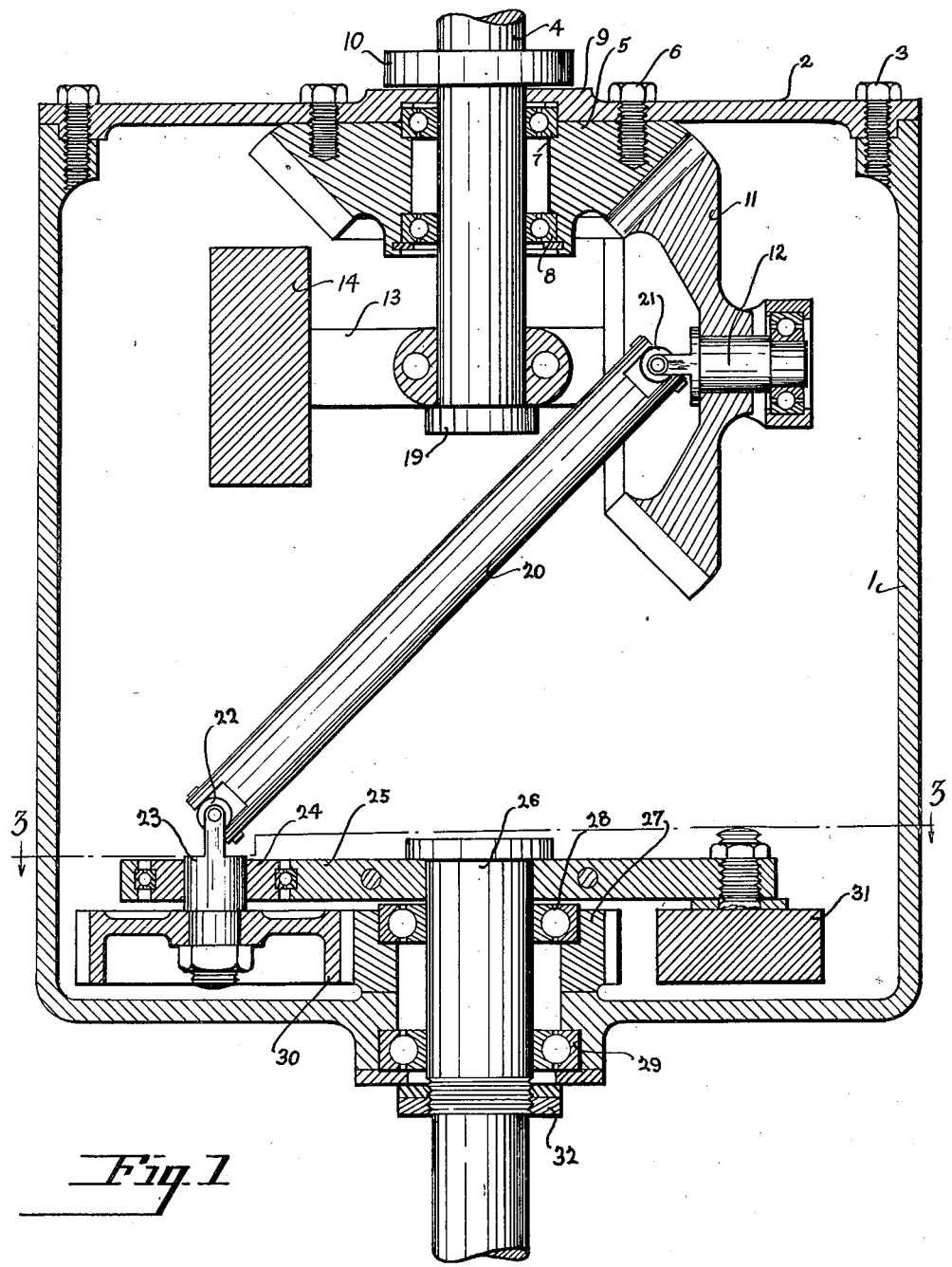
Fig. 1 is a sectional side view of the assembled device.
Figure 2:
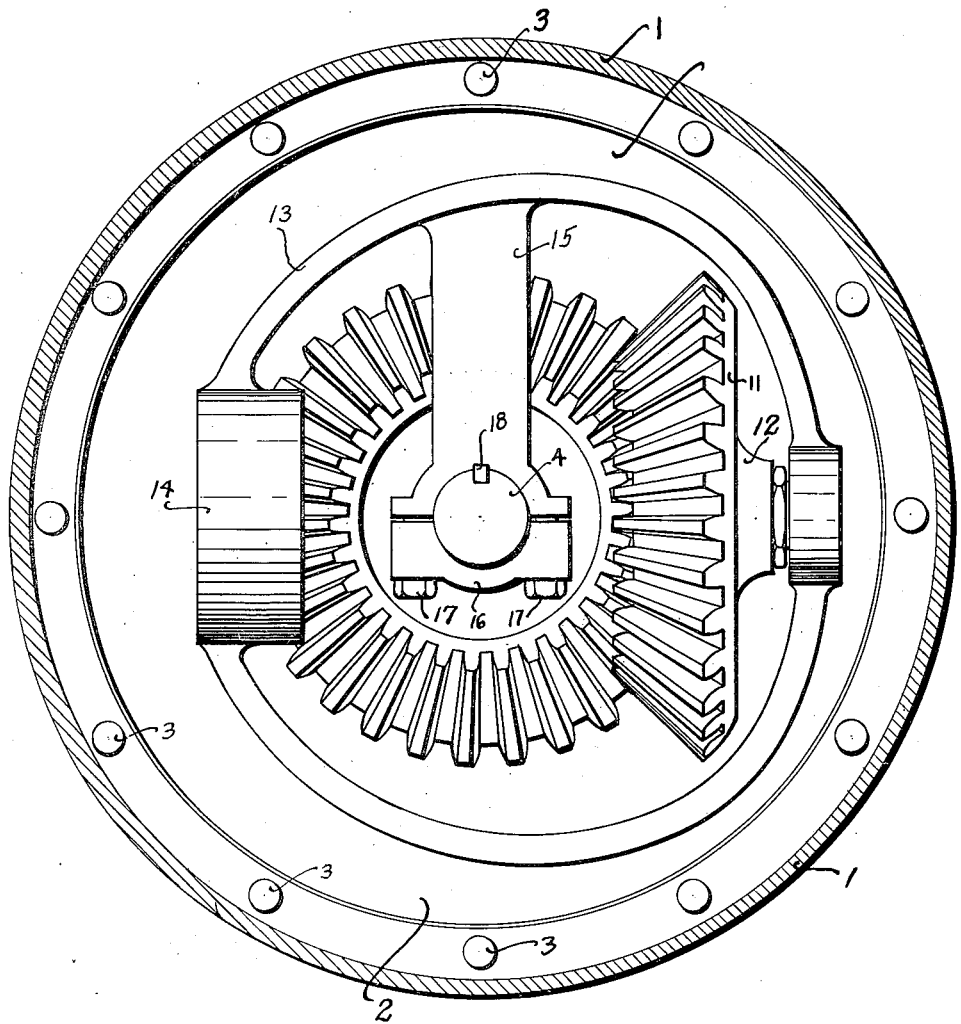
Fig. 2 is a sectional end view of the assembled device. In this view the connecting driving link is not shown.

We have here shown our device as being placed within a case 1. The case 1 has a removable head 2 secured thereto. The head is secured to the case by any suitable fastening means as through the use of set screws 3. A driving shaft 4 passes through the head 2 and through a gear 5. The gear 5 is secured to the head by any suitable fastening means as through the use of cap screws 6. Suitable anti-friction bearings 7 and 8 are provided through which the shaft 4 passes. A pad 9 is disposed upon the outer surface of the head 2 and a collar 10 is positioned upon the shaft 4 and the same rests upon and engages the pad 9 that is disposed upon the outside of the head 2. The gear 5 is a bevel gear and a bevel gear 11 of the same diameter or of a different diameter coacts with the gear 5. The gear 11 is positioned upon a stub shaft 12 and the bevel gear 11 is fixed to the shaft and as the gear 11 is rotated the shaft 12 to which the gear 11 is fixed is also rotated. A spider 13 has a counter-weight 14 disposed within the band of the spider similar in weight to that of the gear 11 so that as the spider is rotated at a fairly high rate of rotation the spider will be in dynamic balance.

The shaft 4 passes through an arm 15 that is formed integral with the spider so that the spider may be clamped to the shaft 4. The clamping may be effected by providing a cap 16 which is clamped to the arm with the conventional cap screw 17. Rotation may be further prevented by placing a key 18 within the head of the arm 15 and within the shaft 4. The spider may be positioned relative to the shaft 4 through the use of a collar or head 19 that is disposed upon the lower end of the shaft 4.

A driving link 20 having universal joints 21 and 22 associated with its respective ends connects the stub shaft 12 with a stub shaft 23 so that as the stub shaft 12 is rotated the stub shaft 23 will also be rotated. The stub shaft 23 passes through an anti-friction bearing 24 that is disposed upon the outer end of an arm 25. A driven shaft 26 has the arm 25 secured thereto and a spur gear 27 is secured to the inside of the case 1 and is fixed relative thereto.

Anti-friction bearings 28 and 29 are provided through which the shaft 26 passes so that as the driven shaft 26 is rotated the friction will be reduced to a minimum. A spur pinion 30 is fixedly secured to the stub shaft 23 and the spur pinion 30 coacts with the spur gear 27 and as the shaft 23 and the spur pinion 30 are rotated, the pinion 30 will travel around the gear 27 and the assembly arm 25 and its associated elements will be rotated about the longitudinal center line of the spur gear 27. A counterweight 31 is secured to the end of the arm 25 opposite to that to which the stub shaft 23 passes to thereby maintain the arm and the pinion assembly in dynamic balance as the arm and associated elements are rotated.

A stuffing box 32 is provided for maintaining lubricants within the bearings disposed above the shaft 26 or for maintaining the case 1 in lubricant-tight condition during its operation.

While the form of mechanism herein shown and described is admirably adapted to fulfill the objects primarily stated, it is to be understood that it is not intended to confine the invention to the embodiment herein shown and described, as it is susceptible of embodiment in various forms, all coming within the scope of the claims which follow.

What we claim is:

1. In a device of the class described, the combination of a case, a head removably secured to the case, a drive shaft passing through the head of the case, a bevel gear fixedly secured to the head and having the drive shaft passing centrally therethrough, a dynamically balanced spider disposed upon the inner end of the drive shaft, a bevel gear carried by the spider coacting with the bevel gear secured to the head of the case, a driving link having a universal joint disposed at its opposite ends, said link being secured to and being rotated by the rotation of the bevel gear carried by the spider, a driven shaft coaxial with the drive shaft, a spur gear having a common center line with the driven shaft, said spur gear being secured to the case, a dynamically balanced arm fixedly secured to the driven shaft, a stub shaft carried by said arm and adapted for being rotated as the link is rotated, and a spur pinion carried by the stub shaft and fixedly secured thereto, said pinion coacting with the spur gear fixedly secured to the case.

2. In a device of the class described, the combination of a case, a drive shaft and a driven shaft having a common axial center line journaled relative to the opposite walls of the case, a pair of fixed gears coaxial with the shafts, one of which is secured to each of the walls of the case, a dynamically balanced spider and a dynamically balanced arm fixed to the respective shafts, a floating gear carried by the spider and a floating gear carried by the arm coacting with the respective gears that are fixed relative to the housing and a driving link connecting the respective floating gears and instrumentalities for effecting rotation to the driving link as the floating gears are rotated.

3. In a device of the class described, the combination of a case, gears fixedly positioned upon the opposite walls of the case, a driving shaft and driven shaft extending through the case and centrally through the respective gears, a pair of floating gears coacting with the shaft gears, dynamically balanced arms carrying said floating gears and a driving link having a plurality of universal joints associated therewith effecting driving communication between the respective floating gears.

4. In a device of the class described, the combination of a case, gears fixedly secured to the interior opposite walls of the case, said gears being coaxial, a driving shaft passing through one of the fixed gears, and a driven shaft passing through the other one of the fixed gears, a dynamically balanced arm associated with each of the respective shafts and fixed relative thereto, a floating gear coacting with each of the fixed gears, and means effecting driving relationship connecting the respective floating gears.

5. In a device of the class described, the combination of a case having a head removably secured thereto, coaxial driving and driven shafts passing through the opposite walls of the case, fixed gears coaxial with the respective shafts and secured to the walls through which the driving and driven shafts pass, and floating gears coacting with the fixed gears, and instrumentalities associated with the floating gears for imparting rotation from one to the other and for imparting rotation to the driven shaft.

EARL C. RUSSELL.
                  LESTER A. COSENS.